(12) United States Patent
Collins et al.

(10) Patent No.: US 7,893,814 B2
(45) Date of Patent: Feb. 22, 2011

(54) METHOD AND APPARATUS FOR TRACKING ITEMS ON A CONVEYER USING CAPACITIVE RFID

(75) Inventors: Timothy J. Collins, Homer Glen, IL (US); Robert A. Perri, Bartlett, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1052 days.

(21) Appl. No.: 11/560,547

(22) Filed: Nov. 16, 2006

(65) Prior Publication Data

US 2008/0117047 A1 May 22, 2008

(51) Int. Cl.
*H04Q 5/22* (2006.01)
(52) U.S. Cl. .................... 340/10.1; 340/854.8; 455/41.1
(58) Field of Classification Search ................. 340/10.1, 340/854.8, 870.37, 825.72; 455/41.1
See application file for complete search history.

(56) References Cited

U.S. PATENT DOCUMENTS

| | | | |
|---|---|---|---|
| 5,785,181 A | 7/1998 | Quartararo, Jr. | |
| 6,392,544 B1 * | 5/2002 | Collins et al. | 340/572.7 |
| 2003/0227392 A1 | 12/2003 | Ebert et al. | |

OTHER PUBLICATIONS

International Search Report mailed Apr. 29, 2008.

* cited by examiner

*Primary Examiner*—Vernal U Brown
(74) *Attorney, Agent, or Firm*—James A. Lamb; Anthony P. Curtis (57) ABSTRACT

A method and apparatus are described for facilitation of radio frequency (RF) communication between a radio frequency identification (RFID) device and RFID tags for a conveyer system. The RFID device is positioned in proximity of the conveyor system. At least one conductive surface is coupled to the RFID device. The conveyer system transports articles, at least one which has one or more associated RFID tags. The conveyer system is operated such that the articles are brought in contact with the at least one conductive surface. The RFID device, the at least one conductive surface and one or more of the associated RFID tags are capacitively coupled allowing RF signals to be communicated between RFID device and the one or more associated RFID tags. This enables data to be electronically read from the one or more associated RFID tags.

20 Claims, 7 Drawing Sheets

METHOD AND APPARATUS FOR TRACKING ITEMS ON A CONVEYER USING CAPACITIVE RFID

BACKGROUND OF THE INVENTION

1. Field of the Invention

The present invention relates to a conveyer system that uses RFID technology.

2. Introduction

The commercial laundering and textile rental industries require tracking of laundry throughout the cleaning process, as well as, sorting and order management when the laundry process is complete. For example, during the cleaning process, uniforms from different customers mix with uniforms from other companies. After the process is complete, the uniforms must be sorted by customer, and delivered to the customer's site.

In these conventional systems, the sorting solutions are either manual, or enabled by barcodes or RFID tags. These solutions are often inaccurate, causing customer dissatisfaction and additional costs to the vendor.

SUMMARY OF THE INVENTION

A method and apparatus that facilitates radio frequency (RF) communication between a radio frequency identification (RFID) device and RFID tags for a conveyer system are disclosed. The method may include positioning an RFID device in proximity of the conveyor system, wherein at least one conductive surface is coupled to the RFID device, the conveyer system being configured to transport a plurality of articles with at least one or more of the plurality of articles having one or more associated RFID tags, and operating the conveyer system such that the plurality of articles are brought in contact with the at least one conductive surface, wherein the RFID device, the at least one conductive surface and one or more of the associated RFID tags are capacitively coupled allowing RF signals to be communicated between RFID device and the one or more associated RFID tags and enabling data to be electronically read from the one or more associated RFID tags.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, apparatus, system and other embodiments that relate to the basic concepts of the invention.

The description herein uses several terms of art throughout and will be described in context below. "RFID device" may be a receiver, tag reader, transmitter, tag programmer, transceiver, etc. The term "associated" may be defined as being inside the container, attached to the container, sealing the container, etc. The "one or more RFID tags" may be associated with every article on the conveyor, some of the articles or just one of the articles on the conveyor. An "RF signal" may be defined as any radio frequency signal or similar energy transmission that may be received and/or transmitted through any medium, including any wireless and/or wired medium. "RF signal communication" maybe defined as the transmission and/or reception of RF signals.

The present invention comprises a variety of embodiments, such as a system and method, and other embodiments that relate to the basic concepts of the invention. This invention may be particularly well suited to capacitively-coupled RFID systems which typically make use of near-field coupling mechanisms.

Figure 1:
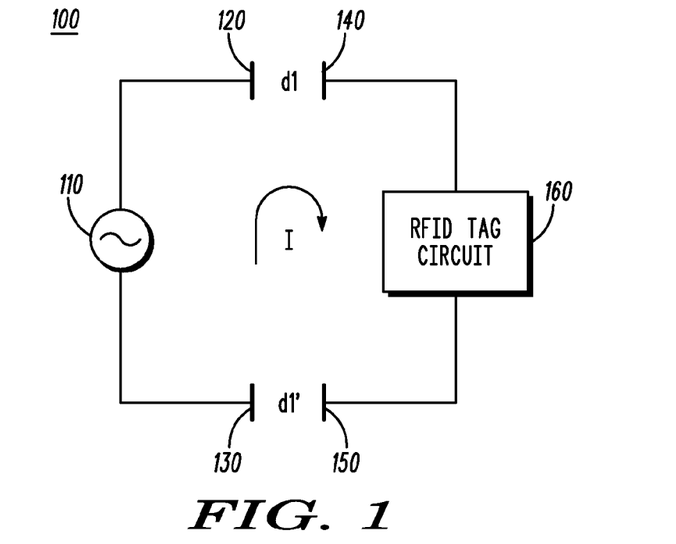
FIG. 1 illustrates an exemplary diagram of an dipole RFID tag reading system in accordance with a possible embodiment of the invention.

FIG. 1 illustrates an exemplary diagram of what is referred to as a dipole configuration of a capacitive RFID tag reading system 100 in accordance with a possible embodiment of the invention. In particular, the RFID tag reading system 100 may include RFID tag reader 110 and RFID tags circuit 160. The plates 120, 130, are associated with the RFID tag reader 110 and the plates 140, 150 are associated with the RFID tag circuit 160 and may be made of any conductive material known to one of skill in the art. The distance d1 between plate 120 and plate 140, and distance d1' between plate 130 and plate 150 will differ as the distance between the RFID tag reader 110 and the RFID tag circuit 160 increases. When powered up, the RFID tag reader 110 capacitively couples through plates 120, 130 and plates 140, 150 to the RFID tag circuit 160. While an "RFID tag reader" is shown as element 110, the element 110 may represent an "RFID device" as described above which may be a receiver, tag reader, transmitter, tag programmer, transceiver, etc.

Figure 2:
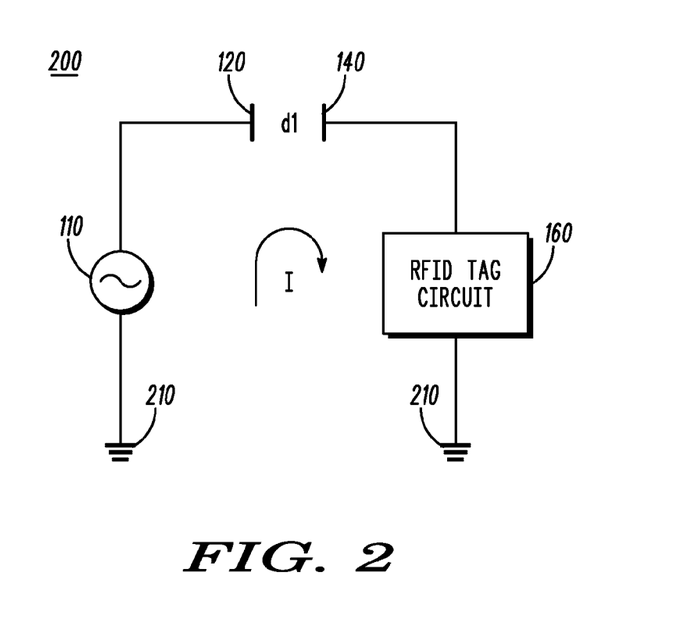
FIG. 2 illustrates an exemplary diagram of an monopole RFID tag reading system in accordance with a possible embodiment of the invention.

FIG. 2 illustrates an exemplary diagram of what is referred to as a monopole configuration of a capacitive RFID tag reading system 200 in accordance with a possible embodiment of the invention. In particular, the RFID tag reading system 200 may include RFID tag reader 110 and RFID tag circuit 160. In this example, only plates 120, 140 are needed as the RFID tag reader 110 and the RFID tag circuit 160 are coupled to ground 210.

Figure 3:
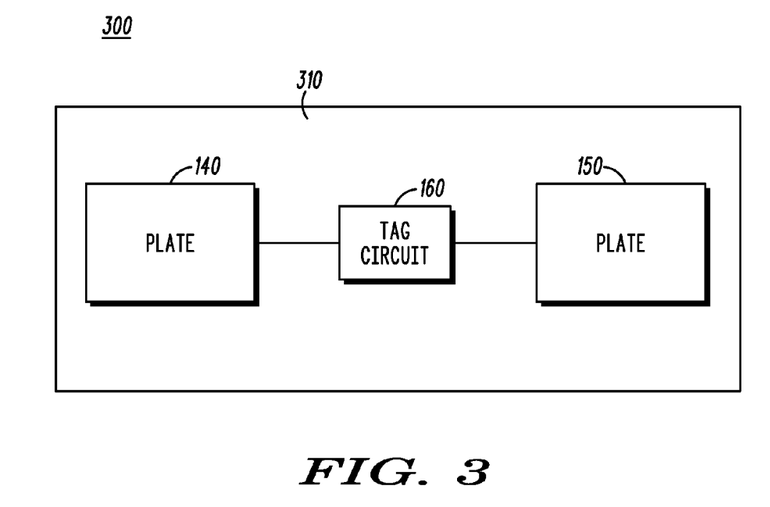
FIG. 3 illustrates an exemplary block diagram of an RFID tag in accordance with a possible embodiment of the invention.

FIG. 3 illustrates an exemplary diagram of an RFID tag 300 in accordance with a possible embodiment of the invention. The RFID tag 300 may include RFID tag circuit 160 connected to plate 140 and plate 150 located on a surface 310. The surface 310 represents a substrate which may include a printed circuit board, paper, printed label, a printed surface of the article, or any other material known to one of skill in the art on which the above elements of the RFID tag 300 may be included. The RFID tag circuit 160 may include a memory which stores a variety of data or information, including the identity of the article to which it is associated, the owner of the article, one or more identification numbers, etc. The RFID tag 300 may also be configured to transmit and/or receive information from another RF device.

Figure 4:
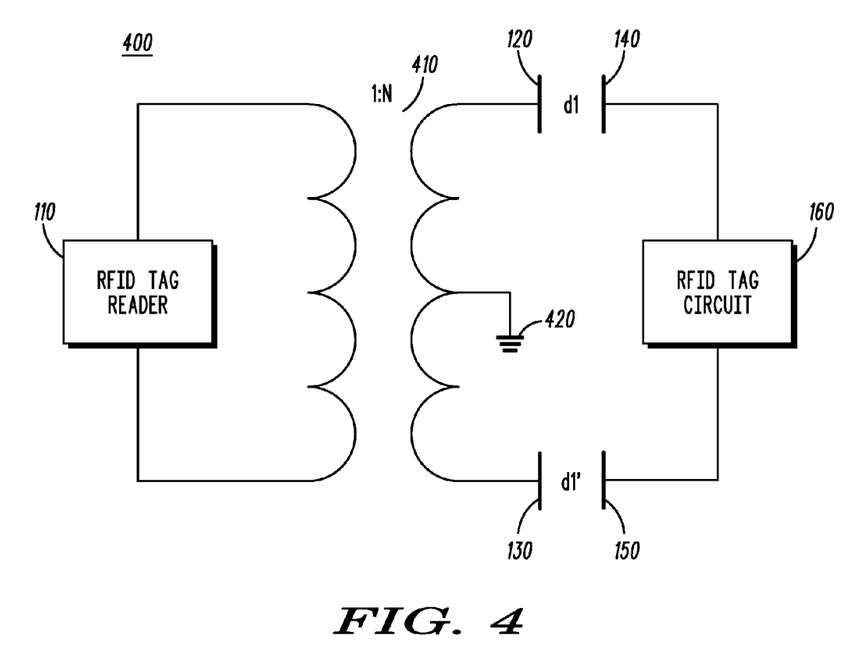
FIG. 4 illustrates an exemplary diagram of an RFID tag reading system in accordance with a possible embodiment of the invention.

FIG. 4 illustrates an exemplary diagram of an RFID tag reading system 400 for use in conveyor systems in accordance with a possible embodiment of the invention. The RFID tag reading system 400 may include RFID tag reader 110 and RFID tag circuit 160.

In this example, a transformer 410 is used to counteract problems inherent in RF applications in conveyor systems. In particular, conveyor systems are generally connected physically to earth ground because inherently in some one or more locations in the building they have to be suspended because of the enormous amount of weight of the articles placed on the conveyor. Furthermore, the attachment causes the conveyor to typically become part of the iron structure in the building. That iron structure is always connected to earth because it is driven into the ground. So one of the problems that is inherent with the conventional technology is that the RF field energy is diminished considerably.

However, in the example shown in FIG. 4, the RF energy level doesn't get affected due to the use of a transformer 410 with the secondary side having a center tap coil that is coupled to ground 420. Thus, the ground 420 floats between plus and minus and will not affect RF communications.

Plates 120, 140 130, 150 are shown as in example illustrated in FIG. 2. As stated above, plates 120, 140, 130, 150 may be made of any conductive material to create the capacitive coupling between the RFID tag reader 110 in the RFID tag circuit 160. However, as shown, as the distances d1 and d1' increase, the required capacitance to couple the RFID tag reader 110 and RFID tag circuit 160 becomes increasingly difficult to maintain because the capacitive coupling impedance between the RFID tag reader 110 and the RFID tag circuit 160 is approximately inversely proportional to distances d1 and d1'.

Figure 5:
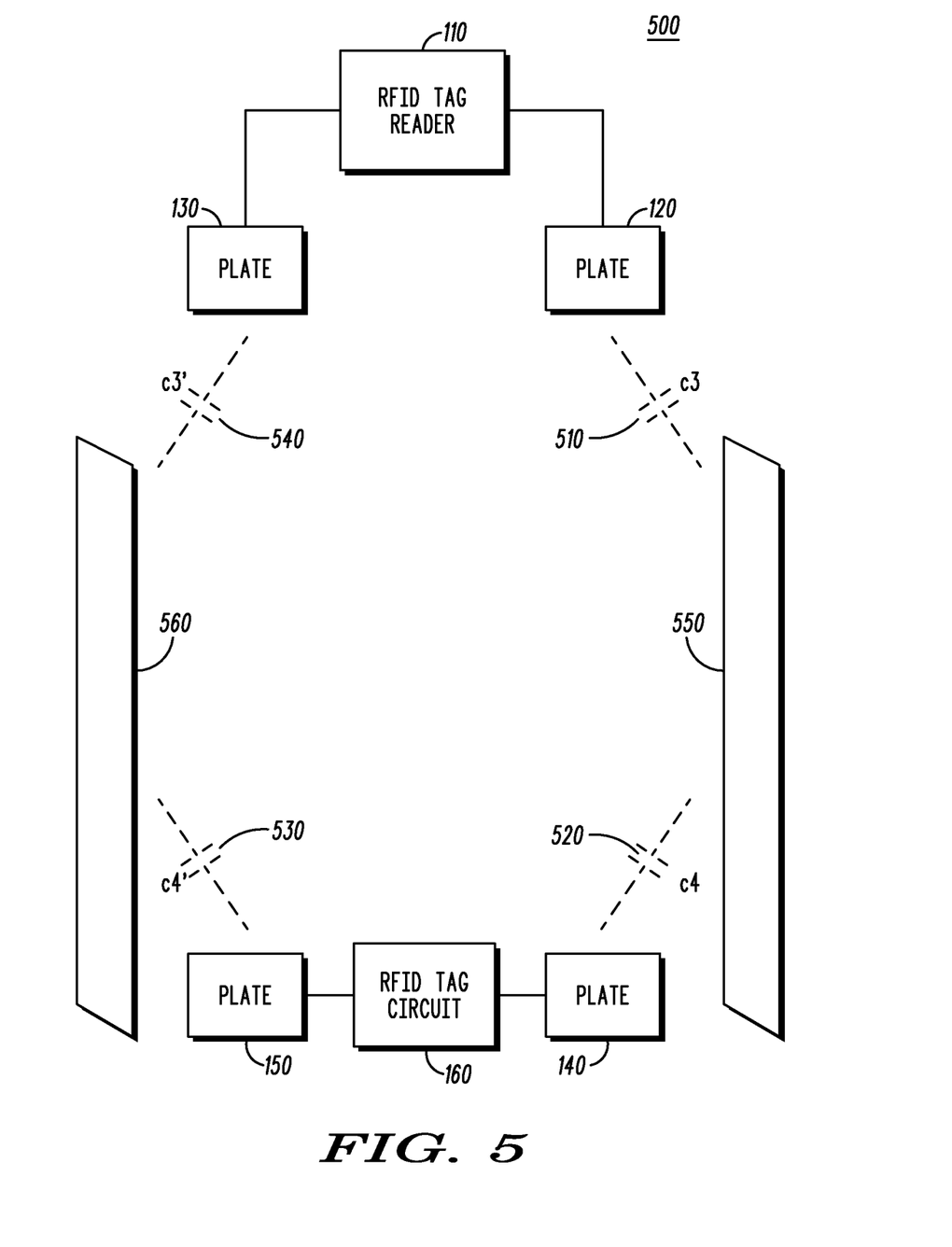
FIG. 5 illustrates an exemplary diagram showing symbolic capacitance in an RFID tag reading system using conductive surfaces in accordance with a possible embodiment of the invention.

FIG. 5 illustrates an exemplary diagram of an RFID tag reading system 500 in accordance with a possible embodiment of the invention. The RFID tag reading system 500 may include RFID tag reader 110, RFID tag circuit 160 and conductive surfaces 550, 560. Conductive surfaces 550, 560 may be placed on the article. The symbolic capacitances between the plates 120, 130 connected to the RFID tag reader 110 and the conductive surfaces 550, 560 are represented by c3 and c3'. The symbolic capacitances between the plates 140, 150 and the conductive surfaces 550, 560 are represented by c4 and c4'.

In this manner, the distances d1 and d1' from FIGS. 1, 2 and 4 between 120, 130 and plates 140, 150, is now bridged by use of the conductive surfaces 550, 560. Therefore, the capacitances c3, c3', c4, c4' required to couple the RFID tag reader 110 to the RFID tag circuit 160 are larger and more easily maintained than the much smaller capacitances formed between plate pairs 120, 140 and 130, 150 in the absence of the conductive surfaces.

Figure 6:
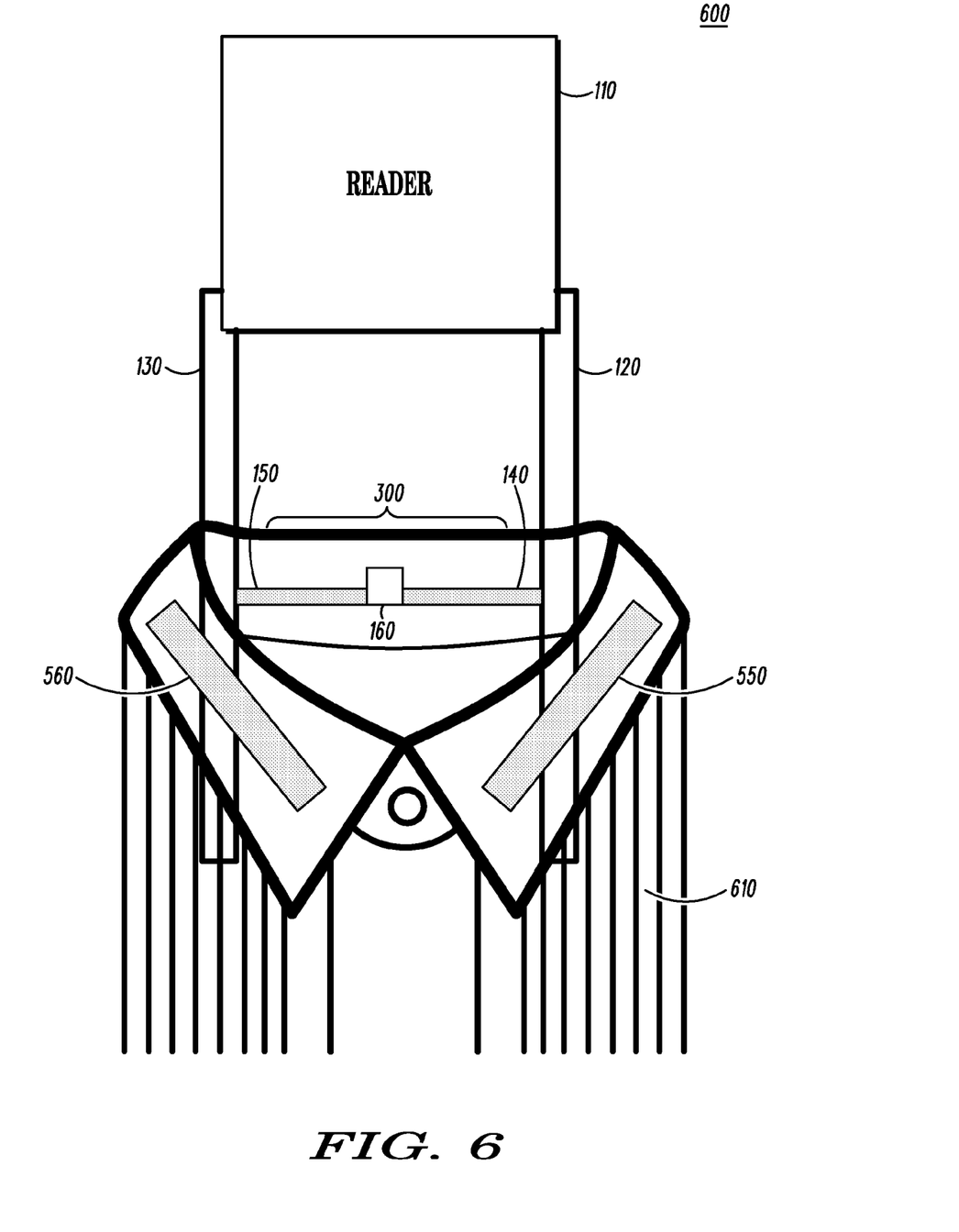
FIG. 6 is an exemplary diagram of an RFID system configured to read RFID tags associated with articles of clothing in accordance with a possible embodiment of the invention.

FIG. 6 illustrates an exemplary RFID tag reading system 600 for a possible application, such as identifying laundry in a laundry conveyer system, for example. While a laundry application is shown in FIG. 6, one of skill in the art may appreciate that the invention described herein may be applied to many different conveyor system types, for example, such as conveyor belts carrying articles, factory conveyors carrying assembly parts, etc.

The exemplary RF ID tag reading system 600 may include plates 120, 130 coupled to an RFID tag reader 110. The plates 120, 130 may be made of any flexible material having conductive properties or containing a conductor which is embedded in or attached to the plates 120, 130. For example, the plates 120, 130 may be a thin metal, Mylar or plastic with a thin metal strip or conductor attached or embedded therein, cloth material with a thin metal strip or conductor attached or embedded therein, etc.

In this laundry conveyor example, when the plates 120, 130 directly or indirectly contact conductive surfaces 550, 560 attached to clothing article 610, respectively, the plates 120, 130 capacitively couple to the conductive surfaces 550, 560, respectively, which in turn are directly connected to preferred) or capacitively coupled to the plates 140, 150, of the RFID tag 300, respectively. This completes the capacitively coupled circuit, such as the one illustrated in FIG. 5, for example. In this manner, the RFID tag reader 110 is able to communicate with RFID tag 300 and may electronically read or transmit data from/to the RFID tag 300. Like in the other possible conveyor examples discussed above, the articles themselves may have conductive properties that may aid in or provide the capacitive coupling properties needed to facilitate RF communications with the RFID tags 300.

Figure 7:
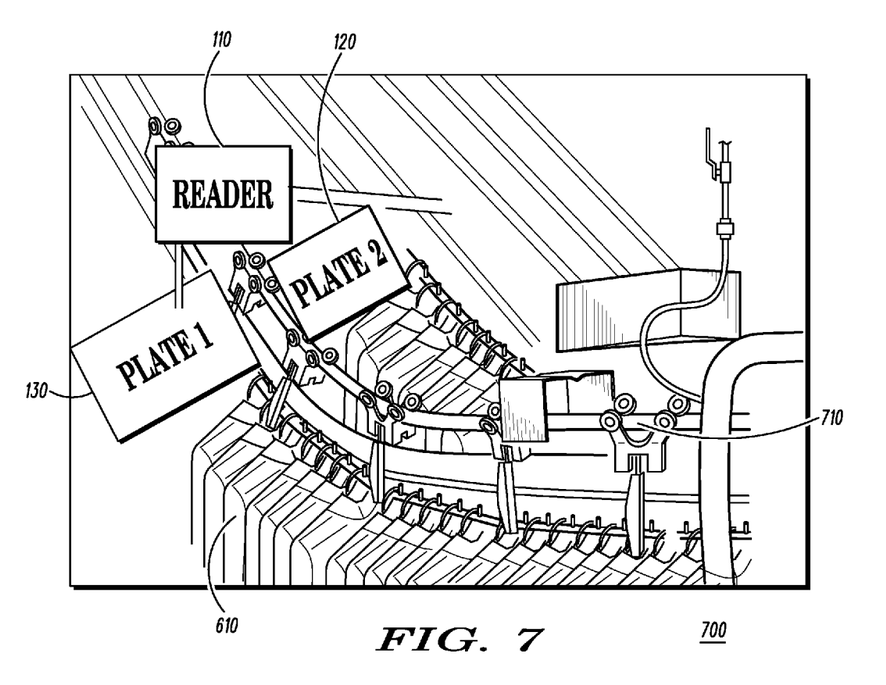
FIG. 7 is a diagram of a conveyer system using an RFID tag reading system in accordance with a possible embodiment of the invention.

FIG. 7 illustrates an exemplary conveyor system 700 that implements the RFID tag reading system 600 discussed above and shown in FIG. 6. In the laundry application, the conveyor system 700 may include a conveyor 710 transporting a plurality of clothing articles 610, and plates 120, 130 coupled to RFID reader 110. As discussed above, one or more of the plurality of clothing articles 610 may include one or more RFID tags 300 and conductive surfaces 550, 560.

Figure 8:
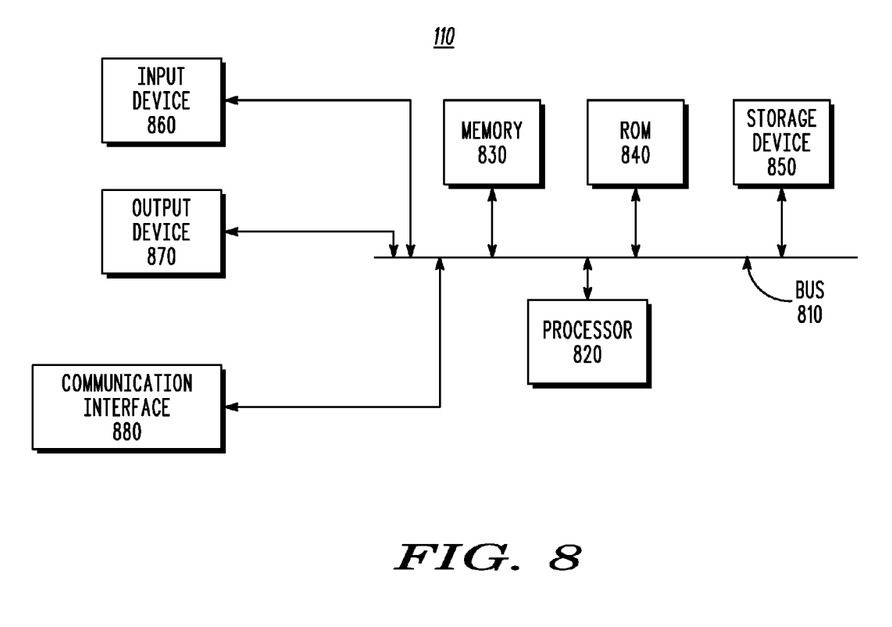
FIG. 8 illustrates an exemplary diagram of an RFID tag reader in accordance with a possible embodiment of the invention.

FIG. 8 illustrates an exemplary RFID tag reader 110, or device which may implement one or more modules or functions of the RFID tag reading process shown below in FIGS. 9. While an RFID tag reader 110 has been shown and discussed, one of skill in the art will recognize that any device capable of capacitively coupling to and communicating with RFID tags 300 is within the spirit and scope of the invention. For example, the RFID tag reader 110 may be an RFID transmitter, an RFID receiver, an RFID transceiver, or an RFID tag programmer. In this manner, the RFID reader 110 may also serve to transmit information to RFID tags 300 as well as reading or receiving data from them.

As shown in the figure, exemplary RFID tag reader 110 may include a bus 810, a processor 820, a memory 830, a read only memory (ROM) 840, a storage device 850, an input device 860, an output device 870, and a communication interface 880. Bus 810 may permit communication among the components of the RFID tag reader 110 or RFID tag reading system 100. Certainly, one of skill in the art will recognize that the RFID reader 110 may include all of the elements, some of the elements or include other elements other than those shown in FIG. 8.

Processor 820 may include at least one conventional processor or microprocessor that interprets and executes instructions. Memory 830 may be a random access memory (RAM) or another type of dynamic storage device that stores information and instructions for execution by processor 820. Memory 830 may also store temporary variables or other intermediate information used during execution of instructions by processor 820. ROM 840 may include a conventional ROM device or another type of static storage device that stores static information and instructions for processor 820. Storage device 850 may include any type of media, such as, for example, magnetic or optical recording media and its corresponding drive.

Input device 860 may include one or more conventional mechanisms that permit a user to input information to RFID tag reader 110, such as a keyboard, a mouse, a pen, a voice recognition device, etc. Output device 870 may include one or more conventional mechanisms that output information to the user, including a display, a printer, one or more speakers, or a medium, such as a memory, or a magnetic or optical disk and a corresponding disk drive. Communication interface 880 may include any transceiver-like mechanism that enables the RFID tag reader 110 to communicate via a network. For example, communication interface 880 may include a modem, or an Ethernet interface for communicating via a local area network (LAN). Alternatively, communication interface 880 may include other mechanisms for communicating with other devices and/or systems via wired, wireless or optical connections. In some implementations of the RFID tag reading systems disclosed herein, communication interface 880 may not be included in the exemplary RFID tag reader 110 when the RFID tag reading process is implemented completely within a particular RFID tag reading system.

The RFID tag reader 110 may perform such functions in response to processor 820 by executing sequences of instructions contained in a computer-readable medium, such as, for example, memory 830, a magnetic disk, or an optical disk. Such instructions may be read into memory 830 from another computer-readable medium, such as storage device 850, or from a separate device via communication interface 880.

The RFID tag reading systems discussed herein and the exemplary RFID tag reader 110 illustrated in figures and the related discussion are intended to provide a brief, general description of a suitable computing environment in which the invention may be implemented. Although not required, the invention will be described, at least in part, in the general context of computer-executable instructions, such as program modules, being executed by the RFID tag reader 110 processor 820. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

For illustrative purposes, the RFID tag reading process will be described below in relation to the block diagrams shown in and discussed in relation to FIGS. 1-8, above.

Figure 9:
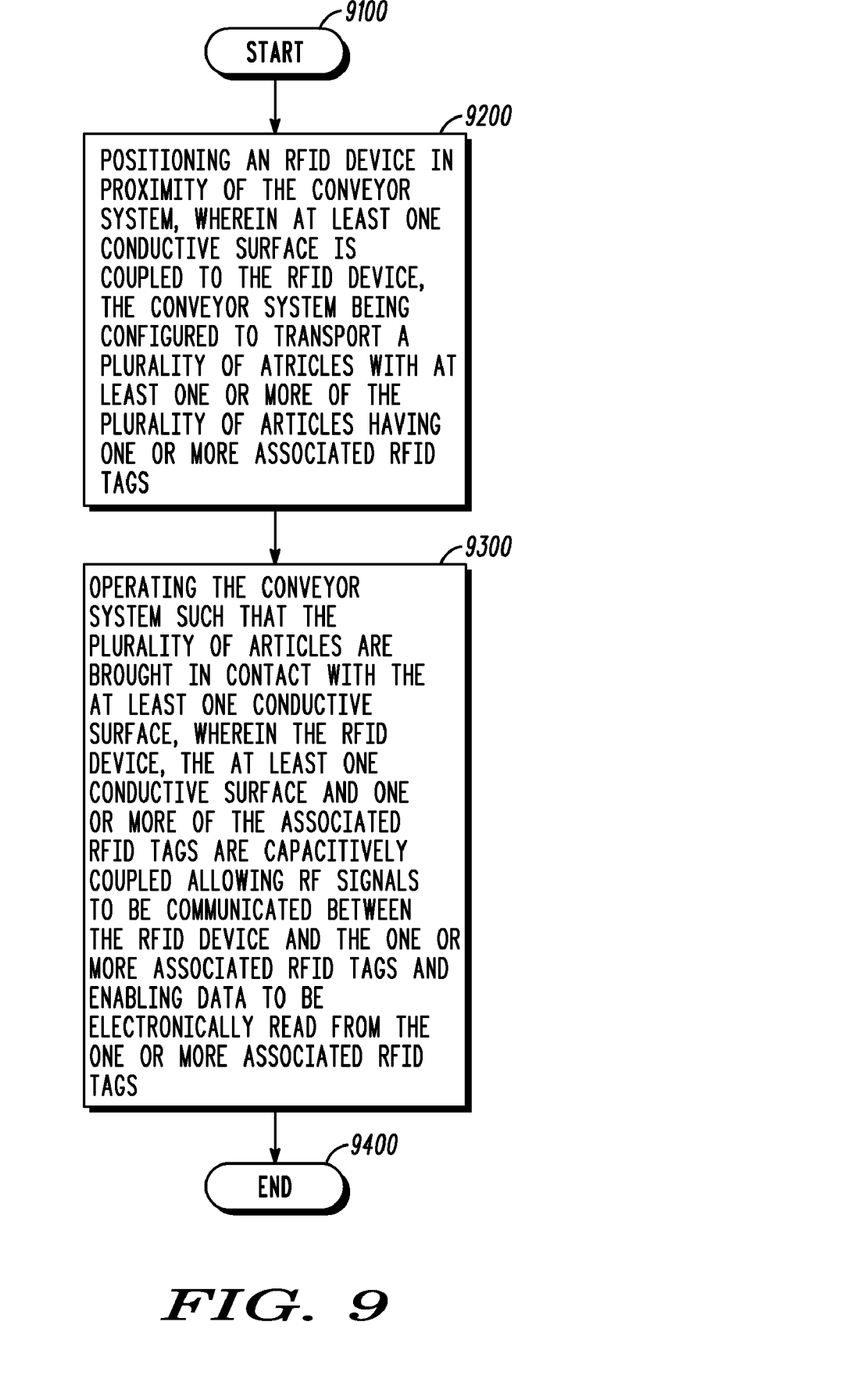
FIG. 9 illustrates an exemplary flowchart for a possible tag reading process in accordance with a possible embodiment of the invention.

FIG. 9 is an exemplary flowchart illustrating some of the basic steps associated with a method for facilitating RF communication between an RFID device (an RFID tag reader 110 in this example) and RFID tags 300 for a conveyer system 700 in accordance with a possible embodiment of the invention. The process begins at step 9100 and continues to step 9200 where the RFID tag reader 110 is positioned in proximity of the conveyer system 700. At least one conductive surface 120, 130 is coupled to the RFID tag reader 110. The conveyer system 700 is configured to transport a plurality of articles 610 with at least one or more of the plurality of articles 610 having one or more associated RFID tags 300.

At step 9300, the conveyer system 700 is operated such that the plurality of articles 610 are brought in contact with the at least one conductive surface 120, 130. The RFID tag reader 110, the at least one conductive surface 120, 130 and one or more of the associated RFID tags 300 are capacitively coupled using the conductive surfaces 550, 560 allowing RF signals to be communicated between RFID tag reader 110 and the one or more associated RFID tags 300. The capacitive couple enables data to be electronically read from the one or more associated RFID tags 300. The process goes to step 9400 and ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the RFID tag reading system embodiments described in FIGS. 1-8 each processing the content in various possible ways. It does not necessarily need to be one system used by all end users. Accordingly, the appended claims and their legal equivalents should only define the invention, rather than any specific examples given.

We claim:

1. A method for facilitating radio frequency (RF) communication between a radio frequency identification (RFID) device and RFID tags for a conveyer system, comprising:

positioning an RFID device in proximity of the conveyor system, wherein at least one conductive surface is coupled to the RFID device, the conveyer system being configured to transport a plurality of articles with at least one or more of the plurality of articles having one or more associated RFID tags;

operating the conveyer system such that the plurality of articles are brought in contact with the at least one conductive surface, wherein the RFID device, the at least one conductive surface and one or more of the associated RFID tags are capacitively coupled through at least one other conductive surface attached to the at least one of the plurality of articles thereby allowing RF signals to be communicated between the RFID device and the one or more associated RFID tags and enabling data to be electronically read from the one or more associated RFID tags.

2. The method of claim 1, further comprising:
electronically reading data from one or more RFID tags to obtain information concerning one or more of the plurality of articles on the conveyer, the at least one conductive surface disposed more proximate than the RFID device to the at least one other conductive surface and the one or more RFID tags.

3. The method of claim 1, further comprising:
registering one or more RFID tags with one or more of the plurality of articles to obtain data concerning each article prior to the plurality of articles being placed on the conveyor.

4. The method of claim 1, wherein at least one of the one or more associated RFID tags are printed on material which can be attached to one or more of the plurality of articles.

5. The method of claim 1, wherein the plurality of articles are a plurality of garments and the conveyor system is a laundry conveyor system, the at least one conductive surface is disposed more proximate than the RFID device to the at least one other conductive surface.

6. An apparatus for identifying articles on a conveyer system, comprising:
at least one conductive surface; and
an RFID device coupled to the at least one conductive surface, wherein when the conveyer system is operated, a plurality of articles positioned on the conveyer are brought in contact with the at least one conductive surface, wherein the RFID device, the at least one conductive surface, and the one or more RFID tags associated with one or more of the plurality of articles are capacitively coupled through at least one other conductive surface attached to the at least one of the plurality of articles thereby allowing RF signals to be communicated between RFID device and the one or more associated RFID tags to enable the RFID device to electronically read data from the one or more associated RFID tags.

7. The apparatus of claim 6, wherein the RFID device electronically reads data from one or more RFID tags to obtain information concerning one or more of the plurality of articles on the conveyer, the at least one conductive surface disposed more proximate than the RFID device to the at least one other conductive surface and the one or more RFID tags.

8. The apparatus of claim 6, wherein the one or more RFID tags are registered with one or more of the plurality of articles to obtain data concerning each article prior to the plurality of articles being placed on the conveyor.

9. The apparatus of claim 8, wherein the registered data is compared with the data electronically read from the one or more associated RFID tags.

10. The apparatus of claim 6, wherein at least one of the one or more associated RFID tags are printed on material which can be attached to one or more of the plurality of articles.

11. The apparatus of claim 6, wherein the plurality of articles are a plurality of garments and the conveyor system is a laundry conveyor system. the at least one conductive surface is disposed more proximate than the RFID device to the at least one other conductive surface.

12. The apparatus of claim 6, wherein the RFID device is one of an RFID tag reader, an RFID transmitter, and an RFID transceiver.

13. The apparatus of claim 6, wherein one or more of the one or more associated RFID tags are passive.

14. The apparatus of claim 6, wherein the RFID device outputs the electronically read data to an external device, wherein the external device is one of a computer terminal, processing device, storage device, and computer-readable medium.

15. The method of claim 1, wherein the RFID device is coupled to the one or more of the associated RFID tags in a dipole arrangement.

16. The method of claim 1, wherein the at least one other conductive surface is physically connected to plates of the one or more associated RFID tags.

17. The method of claim 1, wherein a transformer is disposed between the RFID device and the at least one conductive surface, the transformer arranged such that a coil with a center tap of a secondary is connected to the conveyer system, which is at ground potential, such that the ground floats between plus and minus.

18. The method of claim 1, wherein the at least one other conductive surface does not physically contact either of the RFID device or the one or more of the associated RFID tags.

19. A method for facilitating radio frequency (RF) communication between a radio frequency identification (RFID) device and RFID tags for a conveyer system, comprising:
positioning an RFID device in proximity of the conveyor system, wherein a first conductive surface is coupled to the RFID device, the conveyer system being configured to transport a plurality of articles with at least one or more of the plurality of articles having an associated RFID tag, a transformer being disposed between the RFID device and the first conductive surface, the transformer arranged such that a coil with a center tap of a secondary is connected to the conveyer system, which is at ground potential, such that the ground floats between plus and minus;

operating the conveyer system such that the plurality of articles move such that the RFID device, the first conductive surface and the associated RFID tag are capacitively coupled through a second conductive surface thereby allowing RF signals to be communicated between the RFID device and the associated RFID tag and enabling data to be electronically read from the associated RFID tag.

20. The method of claim 19, wherein the first conductive surface extends from the RFID device, and the second conductive surface is attached to the at least one of the plurality of articles and is capacitively but not physically connected to a plate of the associated RFID tag.

\* \* \* \* \*